United States Patent [19]

Odell et al.

[11] Patent Number: 5,608,023

[45] Date of Patent: Mar. 4, 1997

[54] RATE ENHANCED POLYMERIZATION PROCESSES

[75] Inventors: Peter G. Odell; Richard P. N. Veregin; Gordon K. Hamer, all of Mississauga; Michael K. Georges, Guelph, all of Canada

[73] Assignee: Xerox Corporation, Stamford, Conn.

[21] Appl. No.: 413,663

[22] Filed: Mar. 30, 1995

[51] Int. Cl.⁶ .................................................. C08F 2/38
[52] U.S. Cl. ...................... 526/225; 526/204; 526/217; 526/220; 526/236; 526/278; 526/287; 526/303.1; 526/346; 526/347
[58] Field of Search .................................. 526/225, 220, 526/204

[56] References Cited

U.S. PATENT DOCUMENTS

| | | | |
|---|---|---|---|
| 2,743,263 | 4/1956 | Coover, Jr. | 526/225 |
| 3,249,593 | 5/1966 | Munday | 526/225 |
| 4,355,142 | 10/1982 | Khungar | 526/88 |
| 5,115,055 | 5/1992 | Dais | 526/225 |
| 5,145,924 | 9/1992 | Shero | 526/225 |
| 5,322,912 | 6/1994 | Georges | 526/204 |

*Primary Examiner*—Fred Zitomer
*Attorney, Agent, or Firm*—John L. Haack

[57] ABSTRACT

A polymerization process for the preparation of thermoplastic resin or resins comprising heating a mixture comprised of a free radical initiator, a stable free radical agent, at least one polymerizable monomer compound, and a sulfonic acid salt polymerization rate enhancing compound, to form a thermoplastic resin or resins with a high monomer to polymer conversion and a narrow polydispersity.

29 Claims, 2 Drawing Sheets

RATE ENHANCED POLYMERIZATION PROCESSES

CROSS REFERENCE TO COPENDING APPLICATIONS AND ISSUED PATENTS

Attention is directed to commonly owned and assigned U.S. Pat. No. 5,322,912, issued Jun. 21, 1994, entitled "POLYMERIZATION PROCESSES AND THEIR TONER COMPOSITIONS THEREFROM", wherein there is disclosed free radical polymerization processes for the preparation of a thermoplastic resin or resins comprising: heating from about 100° C. to about 160° C. a mixture comprised of a free radical initiator, a stable free radical agent, and at least one polymerizable monomer compound to form the thermoplastic resin or resins with a high monomer to polymer conversion and a narrow polydispersity; and U.S. Pat. No. 5,312,704, issued May 17, 1994, entitled "MONOMODAL, MONODISPERSED TONER COMPOSITIONS AND IMAGING PROCESSES", wherein there is illustrated a toner composition comprised of pigment particles, and a resin comprised of a monomodal polymer resin or monomodal polymer resin blends and wherein the monomodal resin or resin blends possess a narrow polydispersity.

Attention is directed to commonly owned and assigned copending applications Application Numbers, U.S. Ser. No. 08/181,134, filed Jan. 4, 1994 U.S. Pat No. 5,401,804; U.S. Ser. No. 08/307,192, filed Mar. 25, 1993 abn; continuation-in-part of U.S. Ser. No. 07/976,604, filed Nov. 16, 1992 U.S. Pat. No. 5,322,912, U.S. Ser. No. 08/214,518, filed Mar. 18, 1994, entitled "EMULSION POLYMERIZATION PROCESSES AND TONER COMPOSITIONS THEREFROM"; U.S. Ser. No. 08/223,418, filed Apr. 4, 1994, entitled "AQUEOUS POLYMERIZATION PROCESSES"; U.S. Ser. No. 08/242,490, filed May 13, 1994 U.S. Pat. No. 5,412,047, entitled "ACRYLATE POLYMERIZATION PROCESSES" wherein there are disclosed improved stable free radical moderated polymerization processes for the preparation of homo- and copolymeric resins containing contiguous acrylate or homoacrylate segments by employing an oxo derivative of the cyclic nitroxide compound TEMPO; U.S. Ser. No. 08/317,044, filed Oct. 3, 1994 U.S. Pat. No. 5,545,504, entitled "INK JETTABLE TONER COMPOSITIONS AND PROCESSES FOR MAKING AND USING"; U.S. Ser. No. 08/345,371, filed Jan. 3, 1995, entitled "PROCESS FOR PRODUCING THERMOPLASTIC RESIN POLYMERS"; and U.S. Ser. No. 08/367,636, filed Nov. 18, 1994 U.S. Pat. No. 5,530,079, entitled "POLYMERIZATION PROCESSES".

The disclosures of the above mentioned patents and copending applications are incorporated herein by reference in their entirety.

BACKGROUND OF THE INVENTION

The present invention is generally directed to processes for the preparation of polymers and copolymers. More specifically, the present invention relates to polymerization processes which provide thermoplastic resin products which possess narrow polydispersity properties and which polymerization processes proceed with enhanced monomer to polymer conversion efficiencies. In particular, this invention relates to stable free radical mediated polymerization processes which provide homopolymers, copolymers, block, multiblock, graft, and the like, free radical initiated polymeric products with enhanced rates of polymerization and enhanced yields or monomer to polymer conversions.

The present invention provides, in embodiments, a polymerization process for the preparation of thermoplastic resin or resins comprising: heating a mixture comprised of a free radical initiator, a stable free radical agent, at least one polymerizable monomer compound, and a sulfonic acid salt compound, to form a thermoplastic resin or resins with a high monomer to polymer conversion and a narrow polydispersity.

The present invention provides, in embodiments, homopolymers and copolymers with number average molecular weights ($M_n$) above about 100 to about 1,000 and having a polydispersity or ratio of the weight average molecular weight ($M_w$) to the number average molecular weight ($M_n$) of from about 1.0 to about 2.0, and monomer to polymer conversions in excess of 50 percent.

The present invention provides, in embodiments, a pseudo-living polymerization process that enables the synthesis of narrow polydispersity homopolymers and copolymers, and thermoplastic resins from a variety of free radical reactive unsaturated monomers. The process, in embodiments, uses known free radical initiators in combination with a stable free radical agent, and a sulfonic acid salt compound.

In other embodiments, the stable free radical agent mediated polymerization processes of the present invention can be used to prepare block copolymers and multi-block polymer having narrow polydispersity properties thereby providing a means for preparing surface active or surfactant materials having well defined polydispersity and hydrophobelipophobe balance (HLB) properties.

The polymer resins produced by processes of the present invention, in embodiments, are essentially monomodal, that is the molecular weight distribution is narrow and indicative of a Poisson character and without shoulders or side bands. In embodiments, by repeating the heating step, comprising the combined initiation and polymerization step, there is provided a means for obtaining monomodal mixtures of polymer resins that are compositionally the same resin type having characteristics of both narrow polydispersity and known or selectable modality greater than 1. In embodiments, the process of the instant invention provides a means for conducting polymerization processes on multikilogram or larger scales. The aforementioned embodiments may be accomplished in a one or single pot reactor environment. In embodiments, although not wanting to be limited by theory, it is believed that the polymeric chain growth proceeds by a pseudoliving mechanism and can provide resins of variable molecular weights from very low to very high, for example, less than about 2,000 up to about 200,000 while maintaining narrow molecular weight distributions or polydispersities. In embodiments, block and multiblock copolymers can be synthesized by the aforementioned stable free radical moderated polymerization processes wherein each block formed is well defined in length by the sequentially added and reacted monomer and wherein each additional block that is formed also possesses a narrow molecular weight distribution.

In the aforereferenced commonly assigned U.S. Pat. No. 5,312,704, there are disclosed anionic polymerization processes which provide narrow polydispersity homopolymer and copolymer resins, and which resins possesses useful toner image properties, for example in forming gloss and matte images. The useful toner image properties are believed to be a function of the molecular weight properties and the narrow polydispersity properties of the resins. A salient feature of the anionic polymerization process is the relative speed and ease of the polymerization reactions which are typically conducted at lower temperatures to minimize deleterious side reactions. However, a serious disadvantage of such anionic polymerization processes, including cationic polymerization processes, used for the preparation of narrow polydispersity resins, block and multiblock polymers, is that these processes are highly sensitive to and unsuccessful in the presence of aqueous or protic solvent containing polymerization media, or in the presence of protonic or reactive functional groups.

In commonly owned and assigned U.S. Pat. No. 5,332,912 there is disclosed free radical polymerization processes for the preparation of a thermoplastic resin or resins comprising: heating from about 100° to about 160° C. a mixture comprised of a free radical initiator, a stable free radical agent, and at least one polymerizable monomer compound to form the thermoplastic resin or resins with a high monomer to polymer conversion and a narrow polydispersity. A broad spectrum of free radical reactive monomers, including acrylate and acrylic acid derivatives, are suitable for use in the highly versatile polymerization process. The resins produced thereby possess useful toner image properties. Also disclosed are methods for improving the relative rate of the polymerization process including adding an inorganic acid, organic sulfonic or organic carboxylic acid during heating of polymerization reaction mixtures thereby increasing the rate of formation of the thermoplastic resin or resins from polymerization of the monomer or monomers. Another method disclosed for improving the polymerization process is accomplished by adding a tertiary amine promoter compound to the mixture thereby increasing or accelerating the rate of dissociation of the free radical initiator compound and thereby increase the apparent rate of the polymerization. Another method disclosed for enhancing the apparent rate of the polymerization reaction and for reducing the polydispersity properties of the polymeric products was achieved by including in the heated mixture a dialkyl sulfoxide additive, for example, dimethyl sulfoxide.

Notwithstanding the rate improvements achieved in U.S. Pat. No. 5,332,912, directed towards improving the efficiency and productivity of the free radical polymerization processes, there remains a need for further improvements in the time, and time dependent yield, of stable free radical mediated polymerization processes.

The present invention enables, in embodiments, the preparation of homopolymers, copolymers, block and multiblock copolymers using stable free radical moderated, free radical initiated polymerization systems which provide enhanced yields and accelerated, albeit thermally controlled, rates of polymerization in a variety of reaction media and in the presence of a variety of monomer and polymer functional groups.

The present invention provides, in embodiments, product resins with a latent, thermally reactive, functional group on at least one end which can be used for further reaction to prepare other resins with complex architectures. The present invention, in embodiments, provides polymerization processes that enable control of resin molecular weight, molecular weight distribution, modality of the products, and the like properties.

The present invention is directed, in embodiments, to pseudoliving stable free mediated polymerization processes which permit the economic preparation of homopolymeric and copolymeric narrow polydispersity resins with low, intermediate, or high molecular weights. The low molecular weight resins can be prepared without a chain transfer agent or molecular weight modifier which provides several advantages over conventional chain transfer mediated polymerization processes as illustrated herein.

Copolymers prepared by free radical polymerization processes inherently have broad molecular weight distributions or polydispersities, generally greater than about four. One reason is that most free radical initiators selected have half lives that are relatively long, from several minutes to many hours, and thus the polymeric chains are not all initiated at the same time and which initiators provide growing chains of various lengths at any time during the polymerization process. Another reason is that the propagating chains in a free radical process can react with each other in processes known as coupling and disproportionation, both of which are chain terminating and polydispersity broadening reaction processes. In doing so, chains of varying lengths are terminated at different times during the reaction process which results in resins comprised of polymeric chains which vary widely in length from very small to very large and thus have broad polydispersities. If a free radical polymerization process is to be enabled for producing narrow molecular weight distributions, then all polymer chains must be initiated at about the same time and premature termination by coupling or disproportionation processes must be avoided or eliminated.

The following patents are of interest to the background of the present invention, the disclosures of which are incorporated by reference herein in their entirety:

U.S. Pat. No. 4,581,429 to Solomon et al., issued Apr. 8, 1986, discloses a free radical polymerization process which controls the growth of polymer chains to produce short chain or oligomeric homopolymers and copolymers including block and graff copolymers. The process employs an initiator having the formula (in part) =N—O—X, where X is a free radical species capable of polymerizing unsaturated monomers. The molecular weights of the polymer products obtained are generally from about 2,500 to 7,000 having polydispersities generally of about 1.4 to 1.8, at low monomer to polymer conversion. The reactions typically have low conversion rates and use relatively low reaction temperatures of less than about 100° C., and use multiple stages.

U.S. Pat. No. 5,059,657 to Druliner et al., issued Oct. 22, 1991, discloses a polymerization process for acrylic and maleimide monomers by contacting the monomers with a diazotate, cyanate or hyponitrite, and N-chlorosuccinimide, N-bromosuccinimide or a diazonium salt. The polymer produced can initiate further polymerization, including use in block copolymer formation.

In *J. Macromol. Sci-Chem.*, A14(1), PP. 33–50 (1980) E. Rizzardo and D. H. Solomon, there is disclosed the acid induced free radical decomposition of hydroperoxides and the polymerization of methyl methacrylate with tert-butly hydroperoxide and sulfuric acid.

Other references cited in an international search report for the aforementioned U.S. Pat. No. 5,322,912 are: *J. Am. Chem. Soc.*, 1983, 5706–5708; *Macromol.*, 1987, 1473–1488; *Macromol.*, 1991, 6572–6577; U.S. Pat. No. 4,628,019 to Suematsu et al., issued Aug. 10, 1986; U.S. Pat. No. 3,947,078 to Crystal, issued Aug. 10, 1976; and U.S. Pat. No. 3,965,021 to Clemens et al., issued Jun. 22, 1976.

The following references are also of interest: U.S. Pat. Nos. 3,682,875; 3,879,360; 3,954,722; 4,201,848; 4,542,182; 4,581,429; 4,777,230; 5,059,657; 5,173,551; 5,191,008; 5,191,009; 5,194,496; 5,216,096; 5,268,437; 4,546,160; 4,736,004; and 5,247,024.

In polymerization reaction processes of the prior art, various significant problems exist, for example difficulties in predicting or controlling both the polydispersity and modality of the polymers produced. These prior art polymerization processes produce polymers with high weight average molecular weights ($M_w$) and low number average molecular weights ($M_n$) resulting in broad polydispersities or low molecular weight ($M_n$) and in some instances low conversion. Further, free radical polymerization processes of the prior art are generally prone to generating excessive quantities of heat since the polymerization reaction is exothermic. As the viscosity of the reaction medium increases dissipation of heat becomes more difficult. This is referred to as the Trommsdorff effect as discussed and illustrated in *Principles of Polymerization*, G. Odian, 2nd Ed., Wiley-Interscience, New York, 1981, page 272, the disclosure of which is entirely incorporated herein by reference. This is particularly the situation for reactions with high concentrations of soluble monomer, for example greater than 30 to 50 percent by weight soluble monomer, which are conducted in large scale reactors with limited surface area and limited heat dissipation capacity. Moreover, the exothermic nature of free radical polymerization processes is often a limitation that severely restricts the concentration of reactants or the reactor size upon scale up.

Further, gel body formation in conventional free radical polymerization processes may result in a broad molecular weight distributions and/or difficulties encountered during filtering, drying and manipulating the product resin, particularly for highly concentrated reactions.

These and other disadvantages are avoided, or minimized with the rate and yield enhanced polymerization processes of the present invention.

Thus, there remains a need for polymerization processes for the preparation of narrow polydispersity polymeric resins by economical and scalable free radical polymerization techniques and which polymers retain many or all of their desirable physical properties, for example, hardness, low gel content, processability, clarity, high gloss durability, and the like, while avoiding the problems of gel formation, exotherms, volume limited and multi-stage reaction systems, purification, performance properties of the polymer resin products, and the like, associated with prior art free radical polymerization methodologies.

The polymerization processes and thermoplastic resin products of the present invention are useful in many applications, for example, as a variety of specialty applications including toner and liquid immersion development ink resins or ink additives used for electrophotographic imaging processes or where monomodal or mixtures of monomodal narrow molecular weight resins or block copolymers with narrow molecular weight distribution within each block component are suitable for use, for example, in thermoplastic films and aqueous, organic, or mixed solvent borne coating technologies.

SUMMARY OF THE INVENTION

An object of the present invention is to provide stable free radical polymerization processes and polymers therefrom that overcome many of the problems and disadvantages of the aforementioned prior art processes.

In another object of the present invention is provided, in embodiments, a polymerization process for the preparation of thermoplastic resin or resins comprising heating a mixture comprised of a free radical initiator, a stable free radical agent, at least one polymerizable monomer compound, and a sulfonic acid salt polymerization rate enhancing compound, to form a thermoplastic resin or resins with a high monomer to polymer conversion and a narrow polydispersity.

In another object of the present invention provides for the addition of minor amounts of sulfonic acid salt polymerization rate enhancing compounds to the reaction medium to alter the polymerization rate of monomer without broadening the polydispersity of the polymeric resins and without inducing autopolymerization effects.

In another object of the present invention is provided polymerization processes for the preparation of homopolymeric and copolymeric resins with narrow polydispersities in high conversions.

It is also an object of the present invention to provide polymerization processes for the production of diblock and multiblock polymers with high monomer to polymer conversion and a narrow polydispersity.

It is a further object of the present invention to provide polymerization processes which do not require the use of water or organic solvents, or chain transfer agents as a means of controlling the molecular weight of the incipient or resulting polymers.

Another object of this invention is to provide polymerization processes which result in polymeric resin products having number average molecular weights above 1,000.

Another object of this invention is to provide polymer mixtures having number average molecular weights above about 1,000 to about 200,000 and a polydispersity from about 1.0 to about 2.0.

Another object of this invention is to provide a polymer or polymer mixtures having sufficiently low polydispersity properties and high monomer conversions such that residual monomer levels are low and are within industrially acceptable levels.

Another object of the present invention is to provide a polymerization reaction system which may be conducted in the presence of a minimum amount of conventional reaction media such as water, water soluble and insoluble organic solvents, and mixtures thereof.

In yet another object of the present invention, coupling or disproportionation termination reactions are minimized by reversibly terminating the propagating free radical chains with stable free radical agent which enables and serves to moderate the exothermicity and modality properties of the acrylate polymerization process.

In another object of the present invention is provided a means for the acceleration of the dissociation of the free radical peroxide initiator by the addition of promoter compounds which include, for example, tertiary amines, which ensure that all polymeric chains are initiated nearly simultaneously or at about the same time.

In another object of the present invention provides for the addition of small amounts of organic acids, for example, sulfonic or carboxylic acids, to the reaction medium to alter the normal rate of monomer reaction without broadening the polydispersity of the polymeric resins and without inducing autopolymerization effects.

Still another object of the present invention is to prepare thermoplastic resins by single pot processes employing suitable monomer or monomers, free radical initiator, a stable free radical agent, a sulfonic acid salt polymerization rate enhancing compound and optional minimal amounts of an emulsifier or surfactant which may provide additional rate enhancement or simplify isolation, but avoids emulsification or phase separation during the polymerization.

Another object of the present invention is to prepare resins using polymerization processes wherein the molecular weight of the growing polymer or copolymer chains increase over the entire time period of the polymerization reaction and wherein the percent conversion or degree of polymerization of monomer to polymer with respect to time or number average molecular weight is approximately linear, that is, polymerization processes which occur without the aforementioned Trommsdorff effect.

Still another object of the present invention is to provide polymerization processes for the preparation of resins with narrow polydispersity properties and which polymerization processes are accomplished in a time efficient and economic manner by the addition of sulfonic acid salt polymerization rate and yield enhancing compounds and optional addition of dialkyl sulfoxides, such as dimethyl sulfoxide (DMSO), which promoter compounds result in greater narrowing of the polymer product polydispersity. The dialkyl sulfoxide additives are preferably liquid at the polymerization reaction temperature and may be used in amounts for about several tenths of a weight percent of the total reaction mixture, to use in amounts as the exclusive reaction solvent or reaction media.

Other objects of this invention will be apparent to those skilled in the art in light of the present disclosure and appended claims.

DETAILED DESCRIPTION OF THE INVENTION

A shortcoming associated with the use of the camphor sulfonic acid and chemically related sulfonic acid rate enhancing compounds disclosed, for example, in the commonly assigned U.S. Pat. No. 5,322,912, is that the sulfonic acid compounds can chemically attack and degrade, for example, nitroxyl type stable free radical compounds thereby rendering the stable free radical compounds inactive as a stable free radical moderating agents, and leads to undesired consumption of the stable free radical compound which in turn requires that higher concentrations of "sacrificial" stable free radical compound be added at the outset of the polymerization. This consumption or depletion situation of the stable free radical agent also presents the potential for loss, in extreme circumstances, of control over, for example, exothermicity and polydispersity properties of the polymerization process.

A solution to the problem of sulfonic acid rate accelerating compounds chemically attacking and degrading, for example, nitroxyl type stable free radical compounds, was solved by substituting sulfonic acid salt compounds, for example, the sulfonic acid salt compound, 2-fluoro-1-methylpyridinium p-toluenesulfonate, of the formula (I) in place of the aforementioned less effective and side reaction prone sulfonic acid compounds, for example, camphor sulfonic acid. However, surprisingly and unexpectedly when a series of sulfonic acid salts were examined separately under the same stable free radical polymerization conditions, it was found that only certain sulfonic acid salt compounds were effective in providing living polymerization rate enhancement, for example, the aforementioned 2-fluoro-1-methylpyridinium p-toluenesulfonate compound provided, in embodiments, relative rate enhancements of about 90 percent and above relative to camphor sulfonic acid as illustrated herein.

Another surprising discovery was that the level of cyclic nitroxyl radical, for example, TEMPO, destruction or consumption by the sulfonic acid salt compounds was on the order of several orders of magnitude less than in the case of the corresponding sulfonic acids. For example, the consumption or depletion of TEMPO stable free radical by the aforementioned 2fluoro-1-methylpyridinium p-toluenesulfonate, was about six orders of magnitude less compared to camphor sulfonic acid over the life of a TEMPO stable free radical mediated polymerization of styrene monomer. Thus, in embodiments of the present invention, an significant advantage resides in the aspect that less stable free radical is sacrificially or non productively consumed, therefore less stable free radical compound needs to be added to the reaction mixture at the outset, which in turn enables the polymerization rate to proceed at higher conversion rates since less stable free radical compound is present and therefore provides less competition or excess inhibition of the free monomer with respect to the free radical addition of monomer to the stable free radical mediated propagating polymer chain species.

The present invention provides improved polymerization processes for preparing polymeric resins with well defined molecular weight properties and narrow polydispersities. The processes can be run as batch, semi-continuous or continuous processes. The processes provide for from about 5 to about 99 percent by weight of the reaction mixture to be monomer or monomer mixtures and the processes are conducted at temperatures from about 100° C. to about 180° C. The processes produce polymer products having low, intermediate, or high molecular weight, narrow polydispersity, and relatively low residual salt content. The product polymers can be made salt free by, for example, washing, extraction, precipitation, and the like methods.

In embodiments, the present invention overcomes the problems and disadvantages of the prior art polymerization processes by forming narrow polydispersity polymeric resins by means of, for example, heating for a time, a mixture comprised of a free radical initiator, a stable free radical agent, at least one polymerizable monomer compound, and a sulfonic acid salt polymerization rate enhancing or accelerating compound.

In embodiments, the present invention provides an polymerization process for the preparation of thermoplastic resin or resins comprising heating from about 100° to about 180° C. for a time period of about 30 minutes to about 10 hours, a mixture comprised of a free radical initiator, an nitroxyl or non-nitroxyl stable free radical agent, at least one polymerizable monomer compound, and a sulfonic acid salt compound to form a thermoplastic resin; cooling the solution; and optionally isolating, washing, and drying the resulting thermoplastic resin, wherein the thermoplastic resin possesses a narrow polydispersity of from about 1.0 to about 2.0, and preferably from about 1.0 to about 1.5, a modality of 1, and wherein a monomer to polymer conversion of from about 10 to about 100 percent is achieved.

The foregoing process can, in embodiments, be expanded to enable the formation of bimodal or multimodal thermoplastic resins by for example, as disclosed in the aforementioned commonly owned and assigned U.S. Pat. No. 5,322,912, and for example, copending applications Application Numbers, U.S. Ser. No. 08/181,134, and 07/976,604, the disclosures of which are incorporated herein by reference in their entirety. The resulting resins in the foregoing process, in embodiments can be, for example, a bimodal mixture of a first product resin comprising a diblock copolymer comprised of a first segment containing a block derived from a first monomer and a second block arising from the second monomer mixture, and a second product resin comprised of a homopolymer derived from substantially only the second monomer mixture.

In other embodiments of the present invention, there are provided improved polymerization processes for the preparation of diblock and multiblock thermoplastic resins, as disclosed in the aforementioned commonly owned and assigned U.S. Pat. No. 5,322,912, and for example, copending applications Application Numbers, U.S. Ser. Nos. 08/181,134, and 07/976,604, the disclosures of which are incorporated herein by reference in their entirety, by adding a sulfonic acid salt compound to the polymerization reaction mixture, as illustrated herein. Added monomers can be water soluble, water insoluble, or of intermediate water solubility. Judicious selection of the water solubility properties of added monomers and the resulting polymeric segment(s) enables convenient synthetic routes to block and multiblock copolymers with narrow polydispersities that are useful, for example, as surfactants and emulsifiers.

In yet other embodiments of the present invention, there are provided processes for polymerizing monomers comprising: (a) forming a reaction mixture by feeding into a reactor containing water or solutions of water miscible cosolvent; (i) one or more monomers solutions or suspensions thereof; (ii) a nitroxide stable free radical or other suitable known stable free radical compounds, or a solution thereof in admixture with an effective amount of a suitable sulfonic acid salt polymerization rate enhancing compound; and (iii) a free radical initiator, or a solution thereof, in an effective amount for initiating polymerization of the monomers; and (b) heating the reaction mixture from about 100° C. to about 180° C. to form in a time efficient manner a homopolymeric or copolymeric resin with a narrow polydispersity and high conversion. This process embodiment can be accomplished by adding one or more monomers, a free radical initiator, a sulfonic acid salt compound and the stable free radical compound simultaneously or sequentially in the order (i), followed by (ii), and then (iii).

One class of carboxylic acid or acrylic monomers suitable for use in the present invention are $C_3$–$C_6$ monoethylenically unsaturated monocarboxylic acids, and the alkali metal and ammonium salts thereof. The $C_3$–$C_6$ monoethylenically unsaturated monocarboxylic acids include acrylic acid, methacrylic acid, crotonic acid, vinylacetic acid, and acryloxypropionic acid. Acrylic acid and methacrylic acid are the preferred monoethylenically unsaturated monocarboxylic acid monomers.

Another class of carboxylic acid monomers suitable for the present invention are $C_4$–$C_6$ monoethylenically unsaturated dicarboxylic acids and the alkali metal and ammonium salts thereof, and the anhydrides of the cis dicarboxylic acids. Suitable examples include maleic acid, maleic anhydride, itaconic acid, mesaconic acid, fumaric acid, and citraconic acid. Maleic anhydride and itaconic acid are preferred monoethylenically unsaturated dicarboxylic acid monomers.

The acid monomers useful in this invention may be in their acid forms or in the form of the alkali metal or ammonium salts of the acid. Suitable bases useful for neutralizing the monomer acids include sodium hydroxide, ammonium hydroxide, potassium hydroxide, and the like. The acid monomers may be neutralized to a level of from 0 to about 50 percent by weight, and preferably from 0 to about 20 percent. More preferably, the carboxylic acid monomers are used in the completely neutralized form. Partial neutralization of the carboxylic acid monomers minimizes or eliminates corrosion on parts of the reactor equipment, but conversion of the monomers into polymer product may be diminished. The acidic or labile proton containing monomers may be neutralized prior to, during, or after polymerization. The polymer products are often particularly useful in their partially or completely neutralized form.

In addition, up to about 50 percent by weight of the total polymerizable monomers may be monoethylenically unsaturated carboxylic acid-free monomers. Suitable monoethylenically unsaturated carboxylic acid-free monomers must be copolymerizable with the carboxylic monomers. Typical monoethylenically unsaturated carboxylic acid-free monomers which are suitable in the present invention include alkyl esters of acrylic or methacrylic acids such as methyl acrylate, ethyl acrylate, butyl acrylate; hydroxyalkyl esters of acrylic or methacrylic acids such as hydroxyethyl acrylate, hydroxypropyl acrylate, hydroxyethyl methacrylate, and hydroxypropyl methacrylate; acrylamide, methacrylamide, N-tertiary butylacrylamide, N-methylacrylamide, N,N-dimethylacrylamide; acrylonitrile, methacrylonitrile, dimethylaminoethyl acrylate, dimethylaminoethyl methacrylate, phosphoethyl methacrylate, N-vinylpyrrolidone, N-vinylformamide, N-vinylimidazole, vinyl acetate, styrene, hydroxylated styrenes, styrenesulfonic acid and salts thereof, vinylsulfonic acid and salts thereof, and 2-acrylamido-2-methylpropanesulfonic acid and salts thereof.

Monomers, polymers and copolymers of the present invention can, in embodiments, be separated from one another or from the polymerization reaction mixture by, for example, changing the pH of the reaction media and other well known conventional separation techniques.

Other suitable comohomers include acrylamides, alkyl and aryl amide derivatives thereof, and quaternized alkyl and aryl acrylamide derivatives.

Suitable initiators for the processes of the present invention are any conventional free radical initiators which have a half-life of at least 1 second at the polymerization temperature. Preferably, the initiator will have a half life of from about 10 second to about 2 hours, more preferably from about 10 seconds to about 10 minutes at the reaction temperature. These initiators include, but are not limited to oxygen, hydrogen peroxide, certain alkyl hydroperoxides, dialkyl peroxides, peracids, peresters, percarbonates, peroxides, persulfates, and azo initiators. Specific examples of some suitable initiators include hydrogen peroxide, t-butyl hydroperoxide, di-tertiary butyl peroxide, tertiary-amyl hydroperoxide, potassium persulfate, and methylethyl ketone peroxide. The initiators are normally used in amounts of from about 0.05 percent to about 33 percent based on the weight of total polymerizable monomer. A preferred range is from about 0.5 to about 20 percent by weight of the total polymerizable monomer.

Redox initiators may also be used. These initiators include, but are not limited to, sodium bisulfite, sodium sulfite, isoascorbic acid, sodium formaldehyde-sulfoxylate, and the like, used with suitable oxidizing agents, such as the thermal initiators noted above. If used, the redox initiators may be used in amounts of 0.05 percent to 16 percent, based on the total weight of monomer. A preferred range is from about 0.5 to about 5 percent by weight of total monomer. Many of these initiators introduce salt by-products into the aqueous polymer product. It is preferred that the level of these initiators, if used, be minimized.

The stable free radical selected for use in the present invention may be any known stable free radical agent which enables the objects of the present invention to be achieved. The aforementioned copending applications and commonly assigned patents disclose various stable free radical agents. Examples of stable free radical compounds which are suitable for use in moderating the polymerization of free radical reactive monomers include: 2,2,6,6-tetramethy-1-piperidinyloxy free radical (TEMPO); 4-hydroxy-2,2,6,6-tetramethy-1-piperidinyloxy free radical; 2,2,5,5-tetramethyl-1-pyrrolidinlyoxy; 3-carboxy-2,2,5,5-tetramethyl-1-pyrrolidinyloxy; and di-tert-butyl nitroxide. Other suitable stable free radical compounds include the non-nitroxyl stable free radical compounds disclosed in the aforementioned copending U.S. Ser. No. 08/345,371. A preferred nitroxyl stable free radical compound is 2,2,6,6-tetramethy-1-piperidinyloxy free radical (TEMPO), and the corresponding 4-oxo derivative.

The sulfonic acid salt polymerization rate enhancing compound is of the formula $R-SO_3M$ where R is covalently bonded to the sulfur atom and is selected from the group consisting of alkyl or alkenyl with from 1 to 25 carbon atoms, and an aryl or heteroaryl with from 6 to 25 carbon atoms with substituents selected from the group consisting of hydrogen, halogen, and alkyl or alkenyl with from 1 to 25 carbon atoms, and where M is a quaternary ammonium ion selected from the group consisting of pyridyl or substituted pyridyl with from 5 to 25 carbon atoms, wherein the pyridyl substituents are selected from the group consisting of aryl or heteroaryl with from 6 to 25 carbon atoms, hydrogen, alkyl or alkenyl with from 1 to 25 carbon atoms, and halogen.

A particularly preferred rate enhancing sulfonic acid salt compound useful, in embodiment, in the present invention, is 2fluoro-1-methylpyridinium p-toluenesulfonate of the formula (I) where OTs- is a toluene sulfonate ion.

The inability to effectuate enhanced stable free radical mediated polymerization rates with many of the sulfonic acid salt (I)

compounds examined using the aforementioned nitroxyl stable free radical compound was evident even after considerable variation and manipulation of reaction conditions, reactant substitutions, and reagent ratios.

Hydrophilic stable free radical compounds are known, for example, U.S. Pat. No. 5,264,204, discloses a magnetic resonance organ and tissue imaging method using these compounds, and a number of other suitable stable free radical compounds are available commercially and are readily accessible synthetically, for example, as disclosed in "Synthetic Chemistry of Stable Nitroxides", by L. B. Volodarsky et al., CRC Press, 1993, ISBN:0-8493-4590-1, the disclosures of which are incorporated by reference herein in their entirety.

The monomers of the present invention can be polymerized in a variety of polymerization reaction media. The reaction mixture may contain from about 95 to about 98 percent by weight, preferably from about 20 to about 90 percent by weight, and most preferably from 25 to about 85 percent by weight monomer with the balance comprised of other reactants, reagents, comonomers, and optional additives, solvents, or diluents.

The polymerization of the present invention reactions can be supplemented with a solvent or cosolvent to help ensure that the reaction mixture remains a homogeneous, single phase throughout the monomer conversion. Any solvent or cosolvent may be selected so long as the solvent media is effective in providing a solvent system which avoids undesired precipitation or phase separation of the reactants or polymer products until after all polymerization reactions have been completed. Exemplary solvent or cosolvents useful in the present invention may be selected from the group consisting of polymer product compatible aliphatic alcohols, glycols, ethers, glycol ethers, pyrrolidines, N-alkyl pyrrolidinones, N-alkyl pyrrolidones, polyethylene glycols, polypropylene glycols, amides, carboxylic acids and salts thereof, esters, organosulfides, sulfoxides, sulfones, alcohol derivatives, hydroxyether derivatives such as butyl CARBITOL or CELLOSOLVE, amino alcohols, ketones, water, and the like, derivatives thereof, and mixtures thereof. Specific examples include ethylene glycol, propylene glycol, diethylene glycol, glycerine, dipropylene glycol, tetrahydrofuran, and the like, and mixtures thereof. When mixtures of water and water soluble or miscible organic liquids are selected as the reaction media, the water to cosolvent weight ratio typically ranges from about 100:0 to about 10:90, and preferably from about 97:3 to about 25:75.

Temperature of the polymerization may range from about 100° C. to about 180° C., preferably from about 110° C. to about 175° C. At temperatures below about 100° C., the reaction rate is slow and industrially impractical without the aid of the sulfonic acid salt rate enhancing compound, alone or in admixture with an acid or base accelerating additive compound. At temperatures above about 180° C., conversion of the monomer into polymer decreases and uncertain and undesirable byproducts may be formed. Frequently, these by-products discolor the polymer mixture and may necessitate a purification step to remove them or they may be intractable.

Since solvent and cosolvent admixtures can be used as the reaction media, the elevated temperatures of the polymerization require that the polymerization reactor be equipped to operate at elevated pressure. In general, it is preferred to conduct the polymerization at from about 10 to about 2,000 pounds per square inch (psi), and more preferably at from about 50 to about 1,000 psi.

The molecular weights referred to are measured by gel permeation chromatography using, for example, a polyethylene oxide standards for water soluble polymers and polystyrene standards for organic soluble polymers unless specifically stated otherwise, and thermal gravimetric analysis (TGA) was used for measuring conversions.

Although not being desired to be limited by theory, it is believed that when polymerization reaction processes of the present invention are performed at a temperature at about or above 100° C., the exact temperature depending on the initiator used, all the polymer chains are expected to be initiated at about the same time. This is believed to be an important feature of the present invention in forming polymeric chain products having narrow polydispersities.

The aforementioned undesirable chain coupling or disproportionation termination reactions, so prevalent under the conditions of conventional art free radical polymerization systems, are believed to be suppressed under the conditions of the present invention because the effective instantaneous concentration and availability of living free chains is extremely small. In addition, stable free radical agents of the present invention do not initiate polymerization so that new chains are not initiated after an initial period during which substantially all polymer chains are initiated at about the same time.

Propagating chains of the present invention are referred to as pseudoliving because the stable free radical agent adds to a propagating chain and the chain is temporarily, but reversibly, terminated, reference the aforementioned U.S. Pat. No. 5,322,912, the disclosure of which is incorporated by reference herein in its entirety. The term "protected" as used therein refers, for example, to the availability of oligomeric or polymeric chain radical species for selective rather than indiscriminant further reaction with monomer. An unmoderated free radical polymerization chain, that is, a free radical polymerization process without a stable free radical agent present, in contrast, has a reactive or "open" chain end throughout its lifetime which is typically irreversibly terminated on the order of seconds.

The present invention provides several specific advantages in embodiments as follows.

With the process of the present invention, polymer product polydispersities can be varied from between approximately 1.0 to approximately 2.0 or higher if desired depending on the monomer/comonomer system by varying the ratio of stable free radical agent to free radical initiator molar concentration. When the polymerization process conditions of the present invention are attempted without a stable free radical (SFR) additive present, considerably broader molecular weight resins are obtained.

The stable free radical agent moderated polymerization reactions of the present invention can be performed in a variety of reaction media including bulk, solution, aqueous or organic emulsion, suspension, phase transfer, or reactive extrusion.

During the reaction of monomer or mixtures of monomers to form polymers, the reaction time may be varied over about 1 to 60 hours, preferably between about 2 to 10 hours and optimally about 3 to 7 hours. The optimal reaction time may vary depending upon the temperature, the volume and scale of the reaction, and the quantity and type of polymerization initiator, the sulfonic acid salt compound, other additives, and stable free radical agent selected.

The polymerization reaction temperature, in embodiments, is preferably kept relatively constant throughout the heating step by providing an adjustable external heat source and the temperature is from about 60° C. to about 180° C., and preferably between 100° C. and 160° C., and optimally in embodiments about 120° C. to about 160° C. Reactions performed above 200° C. tend to result in a broadening of the polydispersity. A reaction volume may be selected for any size that enables simple adding, mixing, reacting and isolating the product resins on an economic or convenient scale.

The free radical initiator can be any free radical polymerization initiator capable of initiating a free radical polymerization process of unsaturated monomers and includes peroxide initiators such as benzoyl peroxide, persulfate initiators such as potassium persulfate, azo initiators such as azobisisobutyronitrile, and the like. The initiator concentration employed is about 0.2 to about 16.0 weight percent of the total weight of monomer to be polymerized and is determined by the desired molecular weight of the resin. As the initiator concentration is decreased relative to the weight or molar equivalents of monomer used, the molecular weight or the thermoplastic resin product increases.

Water soluble free radical initiators can be optionally employed in the processes of the present invention and are those that are traditionally used in aqueous polymerization. Examples of water soluble free radical initiators are: persulfates; water soluble peroxides and hydroperoxides; more specifically, sodium, potassium and ammonium persulfate; peroxides such as hydrogen peroxide, t-butyl hydroperoxide, cumene hydroperoxide, para-menthane hydroperoxide; and peroxy carbonates. Other water soluble free radical initiators of similar decomposition mechanism may be used if desired.

A preferred initiator is one which has a one-hour half-life at about 60° to 95° C. and a ten-hour half-life at about 50° to 80° C. Other peroxides, such as peresters and peracids having somewhat higher one-hour half-life/temperature relationships, may also be used if they are accompanied by a promoter compound such as tertiary amine. Such initiators are, for example: 2,4-dimethyl-2,5-dibenzyl peroxyhexane (138° C.), tert-butyl peroxybenzoate (125° C.), di-tert-butyl diperoxyphthalate (123° C.), methyl ethyl ketone peroxide (133° C.), dicumyl peroxide (135° C.) tert-butyl peroxycrotonate (118° C., 2,2-bis-t-butyl(peroxybutane) (119° C.), tert-butylperoxy isopropyl carbonate (119° C.), 2,5-dimethyl-2,5-bis(benzoyiperoxy)-hexane (118° C.), t-butyl peracetate (120° C.), di-t-butyldiperoxy-phthalate (123° C.), and the like. Still other initiators may also be employed if accompanied by a promoter compound in versions of this process, for example, 2,4-pentanedione peroxide (167° C.), di-t-butyl peroxide (149° C.), 2,5-dimethyl-2,5-di(t-butylperoxy)-hexyne (149° C.), 2,5-dimethyl-2,5-di(t-butylperoxy)-hexyne (149° C.), 2,5-dimethyl-2,5-di(tbutylperoxy)hexane (138° C.), and the like. The figures in parentheses are the 1 hour half-life temperatures.

Preferred initiator compounds are: t-butyl peroxy isobutyrate (120° C.); t-butyl peroxy 2-ethylhexanoate (95° C.); t-butyl pivalate (76° C.); and t-amyl peroxy 2-ethyl hexanoate (92° C). Particularly preferred free radical initiators are azobisalkylnitrile and diaroyl peroxide compounds.

The monomer or monomers to be polymerized can, in embodiments, be dissolved in water or aqueous mixtures of polar protic or aprotic organic solvents. The resultant aqueous solution usually contains a suitable water-soluble, free-radical generating initiator such as a peroxide or a persulfate, and the like, as defined above. The monomer or monomers are used in effective amounts relative to the free radical initiator, and stable free radical agent, as defined hereinafter.

The stable free radical agent used for controlled polymerization of monomers or comonomers can be any stable free radical and includes nitroxide free radicals, for example, PROXYL (2,2 5,5-tetramethyl-1-pyrrolidinyloxy) and derivatives thereof, DOXYL (4,4-dimethyl-3-oxazolinyloxy) and derivatives thereof, and TEMPO (2,2,6,6-tetramethyl-1-piperidinyloxy) and derivatives thereof, and the like. These stable free radical agent materials are well known in the literature, see for example G. Moad et. al., *Tetrahedron Letters*, 22, 1165 (1981), as free radical polymerization inhibitors. Other suitable nitroxides used for polymerizing monomers or comohomers are di-tert-butyl nitroxide and related ditertiary alkyl substituted nitroxides. However, under the polymerization conditions of the present invention, the stable free radical agents function not as inhibitors but as moderators to harness the normally highly reactive and indiscriminate propagating intermediate free radical polymer chain species. The stable free radical agents are preferably soluble in the monomer phase, if more than a single phase is present, where predominantly all the polymerization of monomers occurs. Stable free radical agents which have limited monomer solubility are still useful, but may require a monomer miscible cosolvent or else these stable free radical compounds tend to result in less predictable polymerization processes. If the stable free radical agent separates out of the monomer phase to any great extent then the balance desired between the mole ratio of the stable free radical agent, free radical initiator, and propagating free radical polymer chain species may be upset and could lead to polymer products with broadened polydispersities.

The molar ratio of the stable free radical (SFR) agent to free radical initiator (INIT) residing in the monomer phase is from about 0.5 to 5.0, and preferably in the range from about 0.4 to about 4.0. Although not wanting to be limited by theory, in an embodiment, the molar ratio [SFR:INIT.] of stable free radical agent, for example, TEMPO, to free radical initiator, for example, AIBN, is about 2.0 and is believed to be important for success of the process. If the [SFR:INIT.] is too high then the reaction rate is noticeably inhibited. If the [SFR:INIT.] is too low then the reaction product has undesired increased polydispersity.

In embodiments, the molar ratio of monomer content to stable free radical agent to free radical initiator is from about 6.0:0.2:1 to about 10,000:2.5:1 and preferably in the range of about 125:2.0:1 to about 7,000:1.3:1.

Processes of the present invention, in embodiments, provide for selective low, intermediate, and high monomer to polymer conversion rates, or degrees of polymerization, and preferably, for example, of about 90 percent by weight or greater.

The low weight average molecular weight resin products having narrow polydispersity properties, as is also the situation with intermediate and high molecular weight products of the present invention, may be obtained without the use of a chain transfer agent.

Processes of the present invention, in embodiments provide for relatively high weight average molecular weights, from weight average molecular weights ranging in size of from about 2,000 to about 200,000 while delivering narrow polydispersity products.

The monomers and comonomers that can be used in the present invention are any monomer capable of undergoing a free radical polymerization and include but are not limited to styrene, substituted styrenes and derivatives thereof, for example, hydroxylated, sulfonated, and methylated styrenes, acrylates, butadiene and any conjugated diene monomer sufficiently reactive under the specified stable free radical moderated polymerization reaction conditions to afford a stable free radical reaction adduct and subsequently high molecular weight polymer products, for example, polymers or copolymers of styrene, butadiene, n-butyl acrylate, acrylic acid, mixtures thereof, and the like.

The polymerization reaction rate of the monomers may, in embodiments, be inhibited or accelerated and the reaction time influenced by the addition of a minor amount of a protic acid selected from the group consisting of inorganic acids, such as sulfuric, hydrochloric, and the like, and organic sulfonic and carboxylic acids. Although no definitive trend is presently evident, the added acid may have a profound or very little effect on the polymerization rate, depending upon a variety of reaction variables and conditions. Excessive addition of inorganic and organic acid beyond equimolar amounts compared to the stable free radical agent causes the resin polydispersity to broaden. In embodiments, the protic acid source may be in the form of an effective acid functional group contained in either the stable free radical agent or in the free radical initiator compound.

By cooling the polymerization reaction to below 60° to 80° C., the stable free radical moderated polymerization process is effectively quenched or terminated. Each new or subsequent addition of mixtures containing monomer, stable free radical, and initiator, accompanied by heating provides a new polymeric species having a narrow molecular weight distribution and each new polymer species continues to grow along with, but independently of the other stable free radical terminated polymer species already established thereby providing the capability of forming well defined, narrow polydispersity, bimodal and multimodal polymer mixtures.

Alternatively, block copolymer resins may also be prepared whereby after each desired block has been formed a new monomer or monomers is added, without the addition of more initiator or stable free radical agent, to form a new block wherein each block component is well defined in length and has a narrow molecular weight distribution and having properties depending on the repeated sequence and the monomers chosen for incorporation. Monomers added subsequent to the formation of the first formed polymer or thermoplastic resin may be water soluble or water insoluble. Judicious selection of the water solubility properties of added monomers and the resulting polymeric segment enables convenient synthetic routes to block and multiblock copolymers with narrow polydispersities that are useful, for example, as surfactants, resin compatibilizers, viscosity modifies, and emulsifiers.

The polymeric products of the present invention may be optionally crosslinked with, for example, known crosslinking, coupling, or curing agents such as divinyl benzene and the like, either in situ or in a separate post polymerization process step.

Additional optional known additives may be used in the polymerization reactions which do not interfere with the objects of the invention and which may provide additional performance enhancements to the resulting product resin, for example, colorants, lubricants, release or transfer agents, surfactants, stabilizers, antifoams, antioxidants, and the like.

Polymer resins possessing a discrete mixture of monomodal, that is a well defined multimodal molecular weight distribution may in embodiments thereof provide several advantages, particularly for electrophotographic toner compositions such as: melt rheology properties including improved flow and elasticity; and improved performance properties such as triboelectrification, admix rates, and shelf life stabilities.

In the aforementioned U.S. Pat. No. 5,322,912, there is disclosed a monomer polymerized in bulk or in the absence of a solvent or diluent, that is neat, using a mixture of styrene monomer, a free radical initiator, and a stable free radical agent at constant temperature. A plot of weight percent monomer conversion versus number average molecular weight indicates that a nearly linear relationship holds for bulk, solution, or heterogenuous polymerization reaction media using stable free radical agent moderated processes and which relationship is believed to be operative in the present invention. Thus, the Trommsdorff effect, that is, known exothermic heating or autoacceleration of the monomer conversion reaction rate and randomization of molecular weights observed in unmoderated free radical polymerization reactions is effectively suppressed in aqueous or nonaqueous polymerization processes of the present invention even at high solids content, high conversion, and elevated temperature free radical initiated polymerization reactions.

Toner compositions can be prepared by a number of known methods, such as admixing and heating resin particles obtained with the processes of the present invention such as water soluble styrene butadiene copolymer derivatives, pigment particles such as magnetite, carbon black, or mixtures thereof, and cyan, yellow, magenta, green, brown, red, or mixtures thereof, and preferably from about 0.5 percent to about 5 percent of charge enhancing additives in a toner extrusion device, such as the ZSK53 available from Werner Pfleiderer, and removing the formed toner composition from the device. Subsequent to cooling, the toner composition is subjected to grinding utilizing, for example, a Sturtevant micronizer for the purpose of achieving toner particles with a volume median diameter of less than about 25 microns, and preferably of from about 6 to about 12 microns, which diameters are determined by a Coulter Counter. Subsequently, the toner compositions can be classified utilizing, for example, a Donaldson Model B classifier for the purpose of removing toner fines, that is toner particles less than about 4 microns volume median diameter.

Illustrative examples of suitable toner resins selected for the toner and developer compositions of the present invention include polyamides, styrene acrylates, styrene methacrylates, styrene butadienes, vinyl resins, including homopolymers and copolymers of two or more vinyl monomers; vinyl monomers include styrene, p-chlorostyrene, butadiene, isoprene, and myrcene; vinyl esters like esters of monocarboxylic acids including methyl acrylate, ethyl acrylate, n-butyl acrylate, isobutyl acrylate, dodecyl acrylate, n-octyl acrylate, phenyl acrylate, methyl methacrylate, ethyl methacrylate, and butyl methacrylate; acrylonitrile, methacrylonitrile, acrylamide; and the like. Preferred toner resins in admixture with resins include styrene butadiene copolymers, mixtures thereof, and the like. Other preferred toner resins include styrene/n-butyl copolymers, PLIOLITES®; suspension polymerized styrene butadienes, reference U.S. Pat. No. 4,558,108, the disclosure of which is totally incorporated herein by reference.

In toner compositions, the resin particles are present in a sufficient but effective amount, for example from about 70 to about 90 weight percent. Thus, when 1 percent by weight of the charge enhancing additive is present, and 10 percent by weight of pigment or colorant, such as carbon black, is contained therein, about 89 percent by weight of resin is selected. Also, the charge enhancing additive may be coated on the pigment particle. When used as a coating, the charge enhancing additive is present in an amount of from about 0.1 weight percent to about 5 weight percent, and preferably from about 0.3 weight percent to about 1 weight percent.

Numerous well known suitable pigments or dyes can be selected as the colorant for the toner particles including, for example, carbon black like REGAL 330, nigrosine dye, aniline blue, magnetite, or mixtures thereof. The pigment, which is preferably carbon black, should be present in a sufficient amount to render the toner composition highly colored. Generally, the pigment particles are present in amounts of from about 1 percent by weight to about 20 percent by weight, and preferably from about 2 to about 10 weight percent based on the total weight of the toner composition; however, lesser or greater amounts of pigment particles can be selected.

When the pigment particles are comprised of magnetites, thereby enabling single component toners in some instances, which magnetites are a mixture of iron oxides ($FeO \cdot Fe_2O_3$) including those commercially available as MAPICO BLACK, they are present in the toner composition in an amount of from about 10 percent by weight to about 70 percent by weight, and preferably in an amount of from about 10 percent by weight to about 50 percent by weight. Mixtures of carbon black and magnetite with from about 1 to about 15 weight percent of carbon black, and preferably from about 2 to about 6 weight percent of carbon black, and magnetite, such as MAPICO BLACK, in an amount of, for example, from about 5 to about 60, and preferably from about 10 to about 50 weight percent can be selected.

There can also be blended with the toner compositions of the present invention external additive particles including flow aid additives, which additives are usually present on the surface thereof. Examples of these additives include colloidal silicas, such as AEROSIL, metal salts and metal salts of fatty acids inclusive of zinc stearate, aluminum oxides, cerium oxides, and mixtures thereof, which additives are generally present in an amount of from about 0.1 percent by weight to about 5 percent by weight, and preferably in an amount of from about 0.1 percent by weight to about 1 percent by weight. Several of the aforementioned additives are illustrated in U.S. Pat. Nos. 3,590,000 and 3,800,588, the disclosures of which are totally incorporated herein by reference.

With further respect to the present invention, colloidal silicas, such as AEROSIL, can be surface treated with the charge additives in an amount of from about 1 to about 30 weight percent and preferably 10 weight percent followed by the addition thereof to the toner in an amount of from 0.1 to 10 and preferably 0.1 to 1 weight percent.

Also, there can be included in the toner compositions low molecular weight waxes, such as polypropylenes and polyethylenes commercially available from Allied Chemical and Petrolite Corporation, EPOLENE N-15 commercially available from Eastman Chemical Products, Inc., VISCOL 550-P, a low weight average molecular weight polypropylene available from Sanyo Kasei K.K., and similar materials. The commercially available polyethylenes selected have a molecular weight of from about 1,000 to about 1,500, while the commercially available polypropylenes utilized for the toner compositions are believed to have a molecular weight of from about 4,000 to about 5,000. Many of the polyethylene and polypropylene compositions useful in the present invention are illustrated in British Patent No. 1,442,835, the disclosure of which is totally incorporated herein by reference.

The low molecular weight wax materials are optionally present in the toner composition or the polymer resin beads of the present invention in various amounts, however, generally these waxes are present in the toner composition in an amount of from about 1 percent by weight to about 15 percent by weight, and preferably in an amount of from about 2 percent by weight to about 10 percent by weight and may in embodiments function as fuser roll release agents.

Encompassed within the scope of the present invention are colored toner and developer compositions comprised of toner resin particles, carrier particles, the charge enhancing additives illustrated herein, and as pigments or colorants red, blue, green, brown, magenta, cyan and/or yellow particles, as well as mixtures thereof. More specifically, with regard to the generation of color images utilizing a developer composition with charge enhancing additives, illustrative examples of magenta materials that may be selected as pigments include, for example, 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyan materials that may be used as pigments include copper tetra-4-(octadecyl sulfonamido) phthalocyanine, X-copper phthalocyanine pigment listed in the Color Index as CI 74160, CI Pigment Blue, and Anthrathrene Blue, identified in the Color Index as CI 69810, Special Blue X-2137, and the like; while illustrative examples of yellow pigments that may be selected are diarylide yellow 3,3-dichlorobenzidene acetoacetanilides, a monoazo pigment identified in the Color Index as CI 12700, CI Solvent Yellow 160 a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, and Permanent Yellow FGL. The aforementioned pigments are incorporated into the toner composition in various suitable effective amounts providing the objectives of the present invention are achieved. In embodiments, these colored pigment particles are present in the toner composition in an amount of from about 2 percent by weight to about 15 percent by weight calculated on the weight of the toner resin particles.

For the formulation of developer compositions, there are mixed with the toner particles carrier components, particularly those that are capable of triboelectrically assuming an opposite polarity to that of the toner composition. Accordingly, the carrier particles are selected to be of a negative polarity enabling the toner particles, which are positively charged, to adhere to and surround the carrier particles. Illustrative examples of carrier particles include iron powder, steel, nickel, iron, ferrites, including copper zinc ferrites, and the like. Additionally, there can be selected as carrier particles nickel berry carriers as illustrated in U.S. Pat. No. 3,847,604, the disclosure of which is totally incorporated herein by reference. The selected carrier particles can be used with or without a coating, the coating generally containing terpolymers of styrene, methylmethacrylate, and a silane, such as triethoxy silane, reference U.S. Pat. Nos. 3,526,533, 4,937,166, and 4,935,326, the disclosures of which are totally incorporated herein by reference, including for example KYNAR and polymethylmethacrylate mixtures (40/60). Coating weights can vary as indicated herein; generally, however, from about 0.3 to about 2, and preferably from about 0.5 to about 1.5 weight percent coating weight is selected.

Furthermore, the diameter of the carrier particles, preferably spherical in shape, is generally from about 50 microns to about 1,000 microns, and in embodiments about 175 microns thereby permitting them to possess sufficient density and inertia to avoid adherence to the electrostatic images during the development process. The carrier component can be mixed with the toner composition in various suitable combinations, however, best results are obtained when about 1 to 5 parts per toner to about 10 parts to about 200 parts by weight of carrier are selected.

The toner composition of the present invention can be prepared by a number of known methods as indicated herein including extrusion melt blending the toner resin particles, pigment particles or colorants, and a charge enhancing additive, followed by mechanical attrition. Other methods include those well known in the art such as spray drying, melt dispersion, emulsion aggregation, and extrusion processing. Also, as indicated herein the toner composition without the charge enhancing additive in the bulk toner can be prepared, followed by the addition of charge additive surface treated colloidal silicas.

The toner and developer compositions may be selected for use in electrostatographic imaging apparatuses containing therein conventional photoreceptors providing that they are capable of being charged positively or negatively. Thus, the toner and developer compositions can be used with layered photoreceptors that are capable of being charged negatively, such as those described in U.S. Pat. No. 4,265,990, the disclosure of which is totally incorporated herein by reference. Illustrative examples of inorganic photoreceptors that may be selected for imaging and printing processes include selenium; selenium alloys, such as selenium arsenic, selenium tellurium and the like; halogen doped selenium substances; and halogen doped selenium alloys.

The toner compositions are usually jetted and classified subsequent to preparation to enable toner particles with a preferred average diameter of from about 5 to about 25 microns, and more preferably from about 8 to about 12 microns. Also, the toner compositions preferably possess a triboelectric charge of from about 0.1 to about 2 femtocoulombs per micron as determined by the known charge spectrograph. Admix time for toners are preferably from about 5 seconds to 1 minute, and more specifically from about 5 to about 15 seconds as determined by the known charge spectrograph. These toner compositions with rapid admix characteristics enable, for example, the development of images in electrophotographic imaging apparatuses, which images have substantially no background deposits thereon, even at high toner dispensing rates in some instances, for instance exceeding 20 grams per minute; and further, such toner compositions can be selected for high speed electrophotographic apparatuses, that is those exceeding 70 copies per minute.

Also, the toner compositions prepared from resins of the present invention possess desirable narrow charge distributions, optimal charging triboelectric values, preferably of from 10 to about 40, and more preferably from about 10 to about 35 microcoulombs per gram as determined by the known Faraday Cage methods with from about 0.1 to about 5 weight percent in one embodiment of the charge enhancing additive; and rapid admix charging times as determined in the charge spectrograph of less than 15 seconds, and more preferably in some embodiments from about 1 to about 14 seconds.

The following Examples are being supplied to further define various species of the present invention, it being noted that these Examples are intended to illustrate and not limit the scope of the present invention. Parts and percentages are by weight unless otherwise indicated.

EXAMPLES I to IV

The polymerization reactions were carried out in a 100 mL round bottom flask equipped with mechanical stirrer, condenser, and argon inlet/outlet at 125° C., and molecular weights were determined by GPC and conversions by TGA. The reactants and rate enhancing acid or salt additives used in Examples I to IV and the resulting benzoyl peroxide (BPO) initiated TEMPO terminated, polystyrene resin polydispersities are given in the accompanying table.

Figure 1:
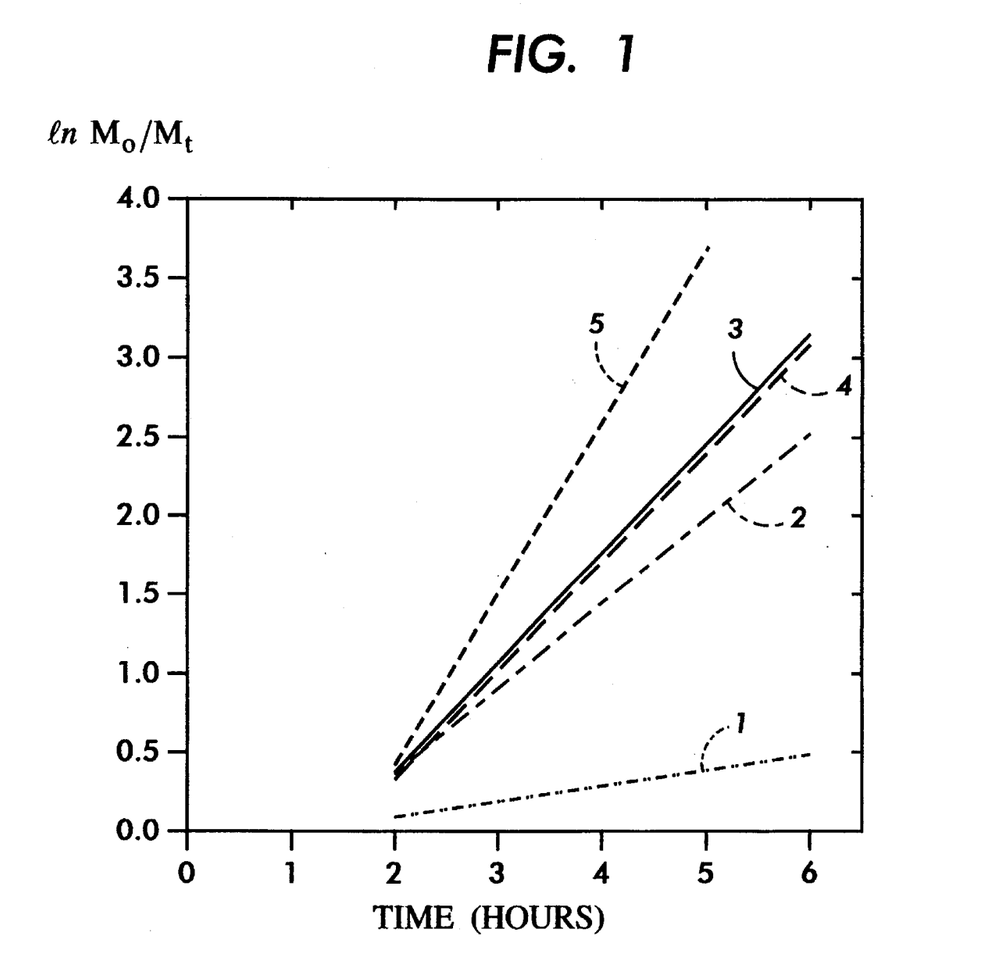
FIG. 1 illustrates, in embodiments, the polymerization rate enhancement provided by the sulfonic acid salt compounds of the present invention.
Figure 2:
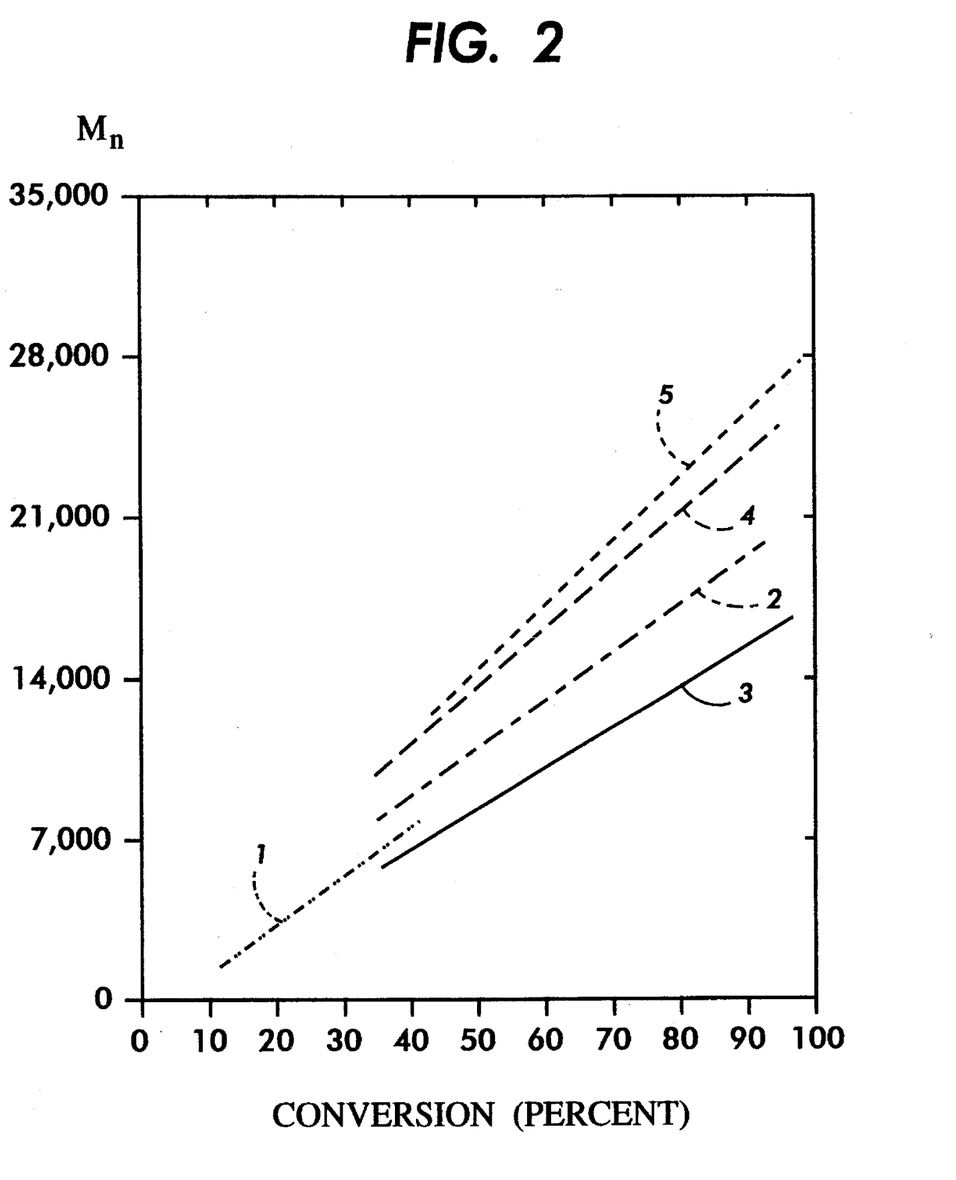
FIG. 2 illustrates, in embodiments, the yield or monomer to polymer conversion enhancement provided by the sulfonic acid salt compounds of the present invention.

In the aforementioned FIGS. 1 and 2, the reference numerals 1 through 5 designate the fitted curves which correspond to the Examples as follows: curve 1 is the control; curve 2 is Example I; curve 3 is Example II; curve 4 is Example IV; and curve 5 is Example III.

TABLE 1

| Example | Styrene | BPO | TEMPO | acid/salt | Polydispersity |
|---|---|---|---|---|---|
| I | 30 g [0.288 mol.] | 0.27 g [1.11 mmol.] | 0.23 g [1.47 mmol.] | CSA 0.121 g [0.52 mmol.] | 1.15 |
| II | 30 g [0.288 mol.] | 0.27 g [1.11 mmol.] | 0.23 g [1.47 mmol.] | FMPTS 0.146 g [0.52 mmol.] | 1.23 |
| III | 30 g [0.288 mol.] | 0.14 g [0.56 mmol.] | 0.12 g [0.74 mmol.] | FMPTS 0.146 g [0.52 mmol.] | 1.32 |
| IV | 30 g [0.288 mol.] | 0.14 g [0.55 mmol.] | 0.12 g [0.74 mmol.] | CSA 0.121 g [0.52 mmol.] | 1.31 |
| Control | 30 g [0.288 mol.] | 0.27 g [1.11 mol.] | 0.23 g [1.47 mol.] | none | — |

The sulfonic acid salt provides a higher rate of polymerization than camphor sulphonic acid (CSA). As shown in FIG. 1, the $k^{obs}$ for camphor sulphonic acid in Example I was $1.49 \times 10^{-4}$ s$^{-1}$, whereas for 2-fluoro-1-methylpyridinium p-toluenesulfonate (FMPTS) in Example II the $k^{obs}$ was $1.94 \times 10^{-4}$ s$^{-1}$. If the number of chains are accounted for by using a ratio of $M_n$ values, then the rates of polymerization in the presence of the sulfonic acid salt or acid become equal. For comparison, a control without salt or acid had a $k^{obs}$ of $2.79 \times 10^{-5}$ s$^{-1}$, which is an order of a magnitude slower. When the initiator/TEMPO levels are lowered, hence raising the relative concentration of the acid or salt, as in Examples III and IV, the expected higher molecular weights and rates are seen. As shown in FIG. 2, there are fewer polymer chains (higher MVV) in Example III but the chains are growing faster than Example IV by about 90%. The 2fluoro-1-methylpyridinium p-toluenesulfonate salt also apparently preserves the narrow molecular weight distributions expected from a stable free radical system.

Mixed salt experiments employing equimolar amounts of 2-fluoro-1-methylpyridinium p-toluenesulfonate (FMPTS) and perfluoro-1-octanesulfonic acid, tetraethylammonium salt (POSATAS) were also carried out. POSATAS is an example of a sulphonic acid salt that apparently retards the rate of stable free radical mediated (and auto) polymerizations.

EXAMPLE V

Magnetic Toner Preparation and Evaluation

The polymer resin (74 weight percent of the total mixture) obtained by the stable free radical polymerization processes in Example I may be melt extruded with 10 weight percent of REGAL 330 carbon black and 16 weight percent of MAPICO BLACK magnetite at 120° C., and the extrudate pulverized in a Waring blender and jetted to 8 micron number average sized particles. A positively charging magnetic toner may be prepared by surface treating the jetted toner (2 grams) with 0.12 gram of a 1:1 weight ratio of AEROSIL R972 (Degussa) and TP-302 a naphthalene sulfonate and quaternary ammonium salt (Nachem/Hodogaya SI) charge control agent.

Developer compositions may then be prepared by admixing 3.34 parts by weight of the aforementioned toner composition with 96.66 parts by weight of a carrier comprised of a steel core with a polymer mixture thereover containing 70 percent by weight of KYNAR, a polyvinylidene fluoride, and 30 percent by weight of polymethyl methacrylate; the coating weight being about 0.9 percent. Cascade development may be used to develop a Xerox Model D photoreceptor using a "negative" target. The light exposure may be set between 5 and 10 seconds and a negative bias used to dark transfer the positive toned images from the photoreceptor to paper.

Fusing evaluations may be carried out with a Xerox Corporation 5028 soft silicone roll fuser, operated at 7.62 cm (3 inches) per second.

The minimum fix and hot offset temperatures of stable free radical polymerization polymers having narrow polydispersities as toners are expected to be improved over toners prepared from resins synthesized by a free radical polymerization process without a stable free radical agent present affording broad polydispersities. The actual fuser roll temperatures may be determined using an Omega pyrometer and was checked with wax paper indicators. The degree to which a developed toner image adhered to paper after fusing is evaluated using a Scotch tape test. The fix level is expected to be excellent and comparable to that fix obtained with toner compositions prepared from other methods for preparing toners having resins with high molecular weights and narrow polydispersities. Typically greater than 95 percent of the toner image remains fixed to the copy sheet after removing a tape strip as determined by a densitometer.

Images may be developed in a xerographic imaging test fixture with a negatively charged layered imaging member comprised of a supporting substrate of aluminum, a photogenerating layer of trigonal selenium, and a charge transport layer of the aryl amine N,N'-diphenyl-N,N'-bis(3-methylphenyl)1,1'-biphenyl-4,4'-diamine, 45 weight percent, dispersed in 55 weight percent of the polycarbonate MAKROLON, reference U.S. Pat. No. 4,265,990, the disclosure of which is totally incorporated herein by reference; images for toner compositions prepared from the copolymers derived from for example, Example XI are expected to be of excellent quality with no background deposits and of high resolution over an extended number of imaging cycles exceeding, it is believed, about 75,000 imaging cycles.

Other toner compositions may be readily prepared by conventional means from the polymer and copolymer resins of the present invention including colored toners, single component toners, multicomponent toners, toners containing special performance additives, and the like.

The stable free radical agent moderated polymerization processes of the present invention may be applied to a wide range of free radical reactive organic monomers to provide novel toner resin materials with desirable electrophotographic properties. For example, homoacrylate containing the block copolymers have application as dispersents for photoreceptor pigments. The multimodal resins have application to low melt resins and certain monomodal resins may be used to modify the surface of carbon black and pigment particles to make the pigment particles more miscible with a host polymer or dispersing medium. Narrow molecular weight resins such as mixtures of poly(styrene-b-n-butyl acrylate) and poly(butyl acrylate) find application as improved toner resins for general application and particularly for detoning or deinking applications which may be achieved by heating at elevated temperatures in aqueous alkali solutions.

The aforementioned patents and publications are incorporated by reference herein in their entirety.

Other modifications of the present invention may occur to those skilled in the art based upon a review of the present application and these modifications, including equivalents thereof, are intended to be included within the scope of the present invention.

What is claimed is:

1. A polymerization process for the preparation of thermoplastic resin or resins comprising:

heating a mixture comprised of a free radical initiator, a stable free radical agent, at least one polymerizable monomer compound, and a sulfonic acid ammonium salt polymerization rate enhancing compound of the formula R—SO$_3$M where R is covalently bonded to the sulfur atom and is independently selected from the group consisting of alkyl and alkenyl with from 1 to 25 carbon atoms, and an aryl and heteroaryl with from 6 to 25 carbon atoms with substituents independently selected from the group consisting of hydrogen, halogen, alkyl and alkenyl with from 1 to 25 carbon atoms, and where M is a quaternary ammonium ion independently selected from the group consisting of pyridyl and substituted pyridyl with from 5 to 25 carbon atoms, wherein the pyridyl substituents are independently selected from the group consisting of aryl and heteroaryl with from 6 to 25 carbon atoms, hydrogen, alkyl and alkenyl with from 1 to 25 carbon atoms, and halogen, to form a thermoplastic resin or resins with a high monomer to polymer conversion of from about 10 to about 90 percent and a narrow polydispersity of from about 1.0 to about 2.0.

2. A process in accordance with claim 1 wherein the sulfonic acid salt polymerization rate enhancing compound is 2fluoro-1-methylpyridinium p-toluenesulfonate of the formula (I) where OTs- is a toluene sulfonate ion 3. A process in accordance with claim 1 wherein the free radical initiator is selected from the group consisting of organic peroxides, organic persulfates, inorganic persulfates, peroxydisulfate, azobisalkylnitriles, peroxycarbonates, perborates, percarbonates, perchlorates, peracids, hydrogen peroxides, and mixtures thereof.

4. A process in accordance with claim 1 wherein the stable free radical agent is selected from the group consisting of nitroxide free radical compounds, cyclic or oxygen substituted cyclic nitroxide free radical compounds, phenoxy stable free radical compounds, quinoxy stable free radical compounds, and mixtures thereof.

5. A process in accordance with claim 1 wherein the polymerizable monomer compound is a free radical reactive unsaturated monomer selected from the group consisting of acids, ammonium salts, and alkali metal salts of: styrene and alkyl substituted styrene compounds, styrene sulfonic and styrene carboxylic acids; vinyl sulfonic acids and vinyl sulfonates, and vinyl phosphonic acid compounds, amine, carboxyl, aldehyde, alkyl, cyano, and hydroxyl substituted acrylic acids and acrylic acid esters having from 2 to about 20 carbon atoms; vinyl sulfones; conjugated dienes; acrylamide; methacrylamide; acrylic acid; methacrylic acid; acrolein; dimethylaminomethacrylate; hydroxy-lower alkyl, and amino-lower alkyl acrylates of the formula CH2=C(—R1)—(C=Z)—R$^2$ where R$^1$ is selected from the group consisting of hydrogen and alkyl with from 1 to about 7 carbon atoms, R$^2$ is selected from the group consisting of —OR$^1$ and —NR$^1{}_2$, and where Z is selected from the group consisting of oxygen and sulfur atoms.

6. A process in accordance with claim 1 wherein the thermoplastic resin product has a polydispersity from about 1.0 to about 1.7 and a monomer to polymer conversion of about 50 percent.

7. A process in accordance with claim 1 wherein the heating is accomplished in a period of time of from about 30 minutes to about 30 hours at a temperature of from about 70° to about 200° C.

8. A process in accordance with claim 1 wherein the rate of polymerization is faster in the presence of the sulfonic acid ammonium salt polymerization rate enhancing compound in an amount of from about 10 to about 95 percent.

9. A process in accordance with claim 1 wherein the monomer to polymer conversion or yield of the polymerization process is higher in the presence of the sulfonic acid ammonium salt polymerization rate enhancing compound in an amount of about 10 to about 90 percent.

10. A process according to claim 1 wherein from about 2 to about 10 different monomers are polymerized.

11. A process according to claim 1 wherein the thermoplastic resin or resins produced therein are isolated.

12. A process according to claim 1 wherein the thermoplastic resin or resins produced therein are washed and dried upon isolation.

13. A process in accordance with claim 1 further comprising adding one or more reaction solvents selected from the group consisting of aliphatic alcohols, glycols, ethers, glycol ethers, pyrrolidines, n-alkyl pyrrolidones, water, halogenated hydrocarbons, aromatic hydrocarbons, and mixtures thereof.

14. A process in accordance with claim 1 wherein the sulfonic acid salt polymerization rate enhancing compound to free radical initiator molar ratio is from about 0.1 to 1.0.

15. A process in accordance with claim 1 wherein the stable free radical agent to free radical initiator molar ratio is from about 0.4 to 2.5.

16. A process in accordance with claim 1 wherein the monomer to free radical initiator molar ratio is from about 100:1 to about 20,000:1.

17. A process in accordance with claim 1 wherein said monomer to polymer conversion is in excess of about 90 percent by weight.

18. A process in accordance with claim 1 wherein the resin or resins have a weight average molecular weight ($M_w$) of from about 2,000 to 200,000 and a number average molecular weight ($M_n$) of from about 1,000 to about 100,000 and a polydispersity of about 1.0 to 2.0.

19. A process in accordance with claim 1 further comprising adding an inorganic acid, organic sulfonic or organic carboxylic acid during heating of said mixture thereby increasing the rate of formation of said thermoplastic resin or resins from said polymerization of said monomer compound.

20. A process in accordance with claim 1 further comprising adding a tertiary amine promoter compound to said mixture thereby increasing or accelerating the rate of dissociation of said free radical initiator and wherein said free radical initiator is an organic peroxide.

21. A process in accordance with claim 1 wherein said thermoplastic resin or resins has a narrow polydispersity of from about 1.1 to about 2.0 and a monomer to polymer conversion of about 50 to about 90 percent.

22. A process in accordance with claim 1 wherein the molar ratio of monomer to stable free radical agent to free radical initiator is from about 100:0.2:1 to about 20,000:2.5:1.

23. A process in accordance with claim 1 wherein said free radical initiator has a half life of from about 5 seconds to about 10 minutes at above about 100° C.

24. A process in accordance with claim 1 wherein said high conversion is from about 50 to 100 percent.

25. A process in accordance with claim 1 wherein said narrow polydispersity in from about 1.0 to about 1.7 and wherein said conversion is from about 10 to 100 percent.

26. A process according to claim 1 further comprising adding to the resulting polymeric mixture and heating a second polymerizable monomer compound which is different from the first added monomer to afford a copolymeric resin or resins with a high monomer to polymer conversion of from about 10 to about 90 percent and a narrow polydispersity of from about 1.0 to about 2.0.

27. A process in accordance with claim 1 further comprising including in the heated mixture a dialkyl sulfoxide additive which promotes further reduction in the polydispersity value of the thermoplastic resin or resins, wherein the sulfoxide is added in an amount from about 0.1 to about 100 weight percent of the reaction media.

28. A process in accordance with claim 1 wherein the amount of stable free radical agent required in the polymerization is less in the presence of increasing amounts of the sulfonic acid salt compound, and wherein the required amount of sulfonic acid salt is reduced by from about 10 to about 90 percent.

29. A free radical polymerization process for the preparation of thermoplastic resin comprising:

heating from about 100° to about 200° C. for a time period of about 30 minutes to about 10 hours a mixture comprised of an azobisalkylnitrile free radical initiator, a nitroxide stable free radical agent, a sulfonic acid ammonium salt polymerization rate enhancing compound, and at least one polymerizable acrylate monomer compound to form said thermoplastic resin;

cooling said solution;

optionally isolating said thermoplastic resin; and optionally washing and drying said thermoplastic resin, wherein said thermoplastic resin possesses a narrow polydispersity from about 1.1 to about 1.7, a modality of 1, wherein said resin contains from about 5 to about 4,000 contiguously bonded monomer units, and wherein a monomer to polymer conversion from about 10 to about 100 percent is achieved.

* * * * *